Dec. 18, 1934. M. WALKER ET AL 1,985,121
ADVERTISING APPARATUS AND DISPLAY SIGN
Filed May 2, 1932 5 Sheets-Sheet 1
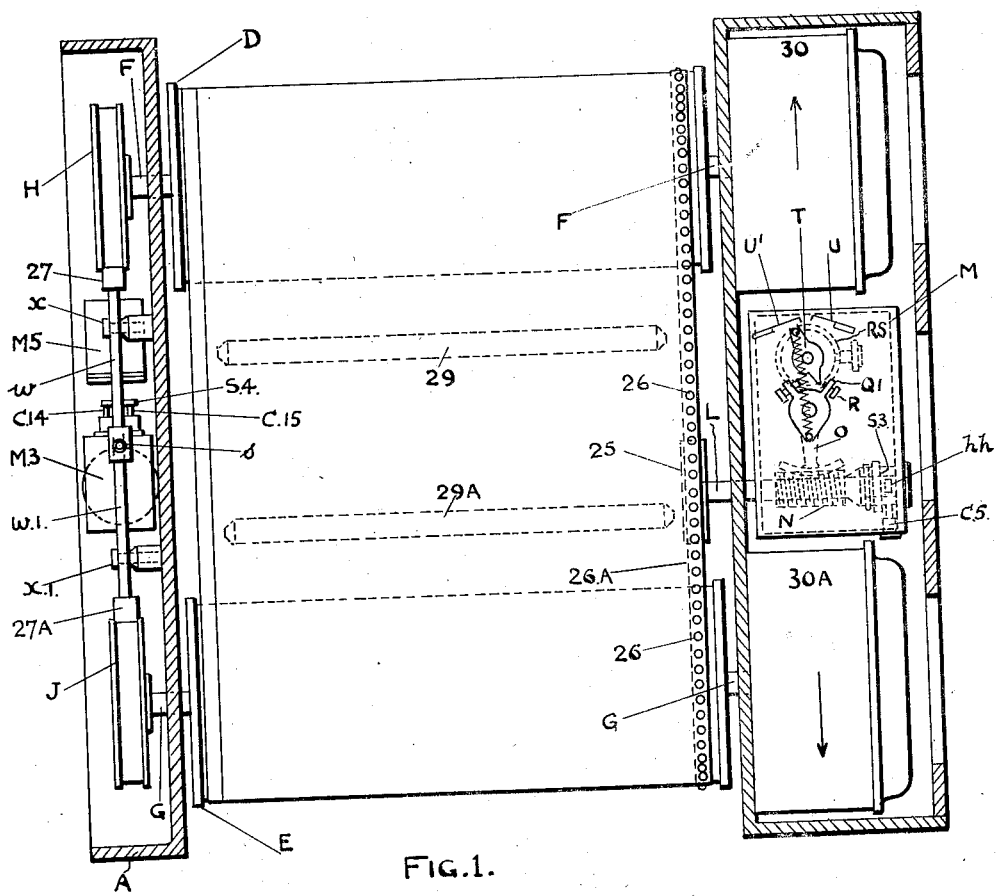
FIG.1.
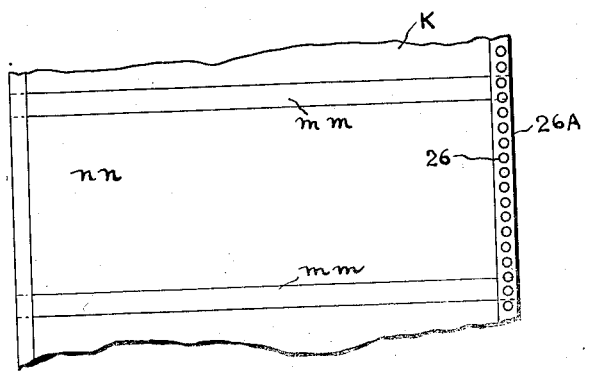
FIG 1.A.
Inventors
M. Walker
M. M. Walker
and G. M. Clark
by Wilkinson & Mawhinney
Attorneys.

Dec. 18, 1934.    M. WALKER ET AL    1,985,121
ADVERTISING APPARATUS AND DISPLAY SIGN
Filed May 2, 1932    5 Sheets-Sheet 2

Inventors
M. Walker
M. M. Walker
and G. M. Clark
by Wilkinson & Mawhinney
Attorneys.

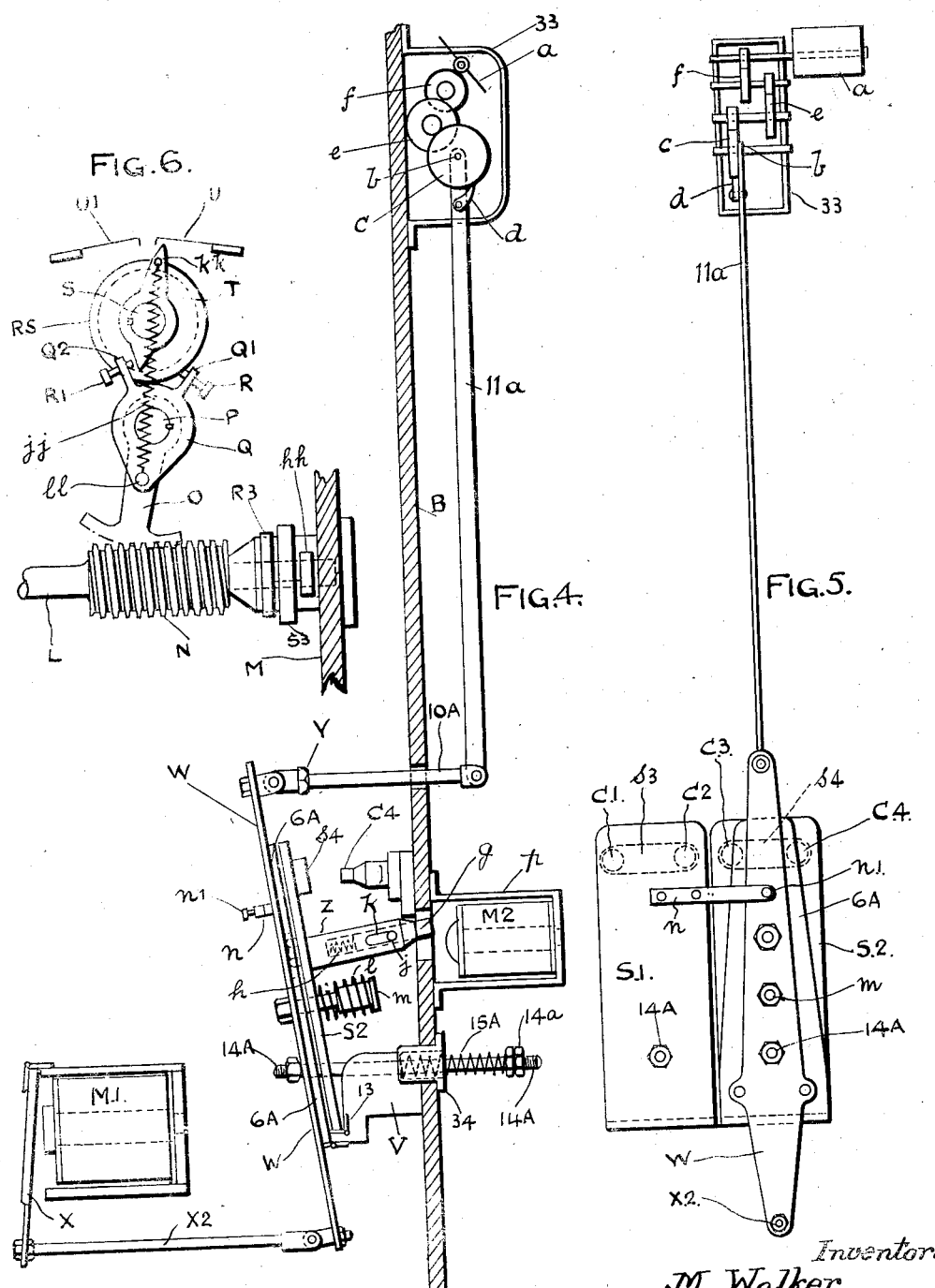

Dec. 18, 1934.  M. WALKER ET AL  1,985,121
ADVERTISING APPARATUS AND DISPLAY SIGN
Filed May 2, 1932  5 Sheets-Sheet 4
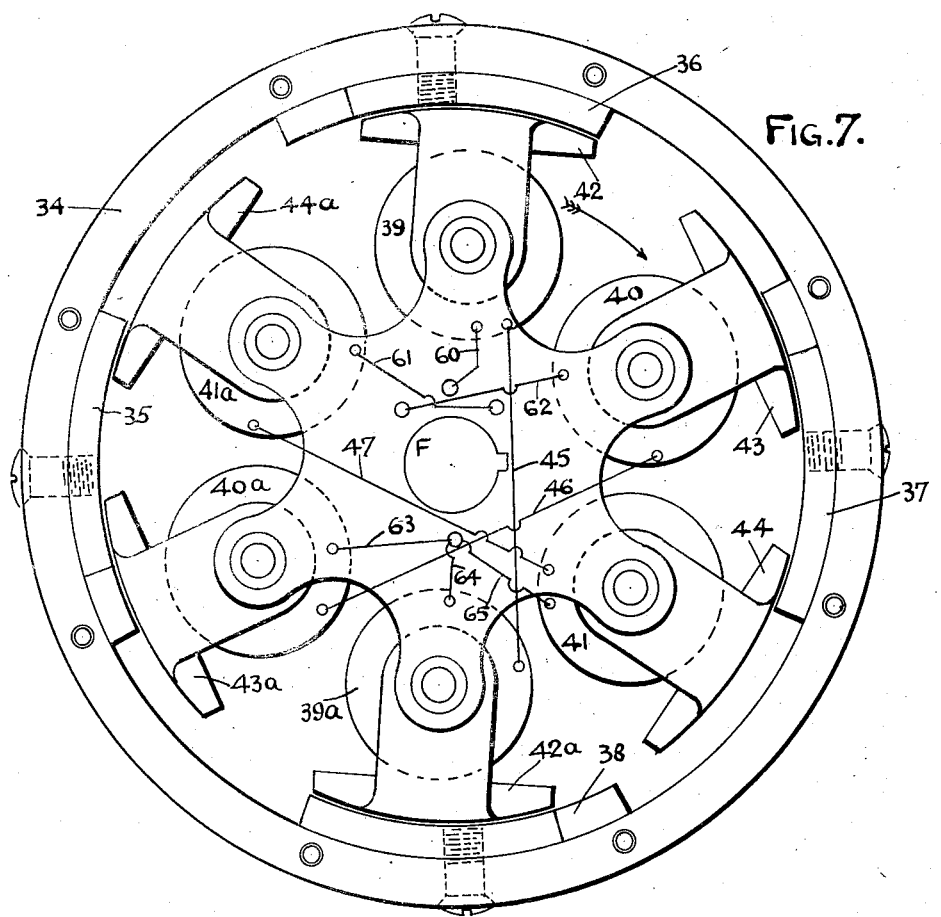
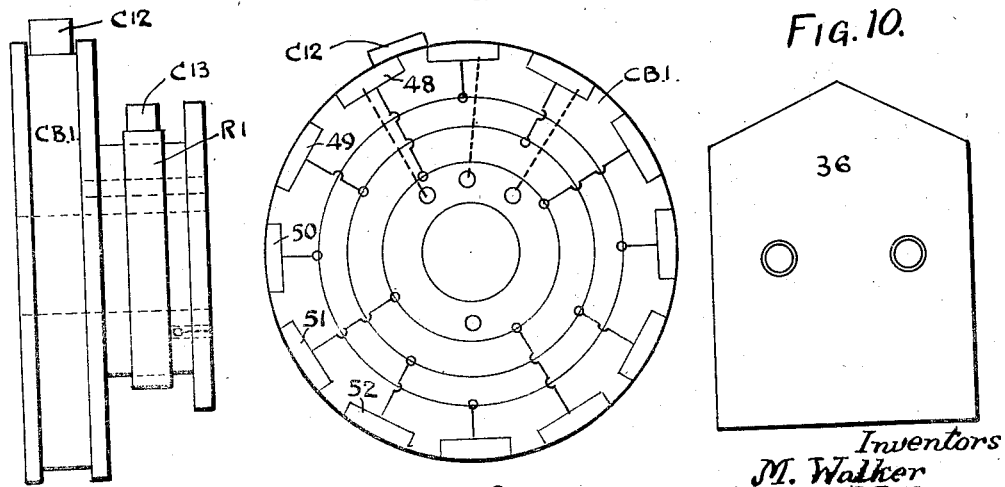

Patented Dec. 18, 1934

1,985,121

UNITED STATES PATENT OFFICE 1,985,121

ADVERTISING APPARATUS AND DISPLAY SIGN

Malcolm Walker, Malcolm Montague Walker, and George Morton Clark, West Lothian, Scotland Application May 2, 1932, Serial No. 608,824
In Great Britain May 27, 1931

5 Claims. (Cl. 40—52)

Our invention relates to improvements in and connected with advertising apparatus and display signs of the reel and web type, and has for its object, inter alia, to so construct the apparatus as to be reliable in operation, and avoid advertisements or announcements getting out of line of aperture when being displayed, and to provide a simple and quick method of changing the advertisements or announcements.

According to this invention, we provide a suitable casing or housing, in which are suitably mounted a top and bottom roller, to which the screen on which the advertisements or announcements appear is attached. The screen is divided off into compartments or sections, each individual advertisement or announcement being of suitable size to slip into a compartment or section, so that the advertisement or announcement can be changed at any time without trouble, or the advertisement or announcement may be otherwise suitably detachably attached to the screen, and without, as hithertofore, having to scrap the whole screen. At the back of the screen, at one end thereof, is suitably mounted a metering-wheel held against the screen by means of a suitable spring control or other suitable device. The metering-wheel controls the stopping and starting electro-magnetically operated switches, which, in turn, control the spacing of the advertisements or announcements.

In order to maintain a flat surface on the screen, two plates of glass or other transparent material are, or may be suitably mounted between the housings, between which the screen passes.

Each roller is driven by means of a magnetic impeller, the stopping and starting of which is controlled by the electro-magnetically operated switches.

In order to obtain an even and regular spacing of the screen, a suitable friction-brake and a friction speed regulator are mounted on one end of each roller shaft, these brakes being controlled by an electro-magnet.

To reverse the action or movement of the rotation of the apparatus, a drum-switch is provided, the action of which is controlled by a worm and sector gear driven by the metering-wheel, or other suitable gear.

The modus operandi is as follows:—

The advertisements or announcements are placed in position in the several compartments or sections of the screen, or are suitably detachably attached to the screen, and the electric current is switched on from the main or other source of supply and the impeller is put into action.

After a given length of screen has passed in front of the aperture and the metering-wheel has made one revolution, contact is made by means of a contact segment mounted on the shaft to which the metering-wheel is keyed or fixed. This contact energizes the electro-magnet, which, in turn, applies a brake on the end of the roller shaft. Also by means of the same contact another electro-magnet is energized, which, in turn, opens a four-pole contactor-switch. The machine is now temporarily stopped for a predetermined period of time to display the advertisement or announcement. The closing of the contactor-switch is controlled by a gear driven vane or air brake, or any other suitable control gear. On the closing of this contactor-switch, the cycle of operation is repeated.

When the last advertisement or announcement on the screen is exposed, the drum-switch, which is operated by a sector and worm gear driven by means of the metering-wheel, brings in the reverse contact. The drum-switch is operated on the last advertisement or announcement on the screen, so that the current is transferred to the other impeller, and so allows the machine to operate in the reverse direction. When this takes place, the last advertisment or announcement becomes the first.

In order that our invention may be properly understood and readily carried into effect, we have hereunto appended five sheets of drawings, of which Figure 1 is a front elevation, the end supporting frames being in section.

Figure 1A is view of part of screen showing one method of carrying the advertisements or announcements.

Figure 4 is a detailed view of the contactor-switch and time-lag.

Figure 5 is a front view of Figure 4.

Figure 6 is an end view of the reversing drum-switch.

Figure 7 is an end view of the magnetic impellers, the cover being removed.

Figure 8 is a side view of the contact-breaker.

Figure 9 is a front view of Figure 8.

Figure 10 is a plan of the magnetic collector.

Figure 2:
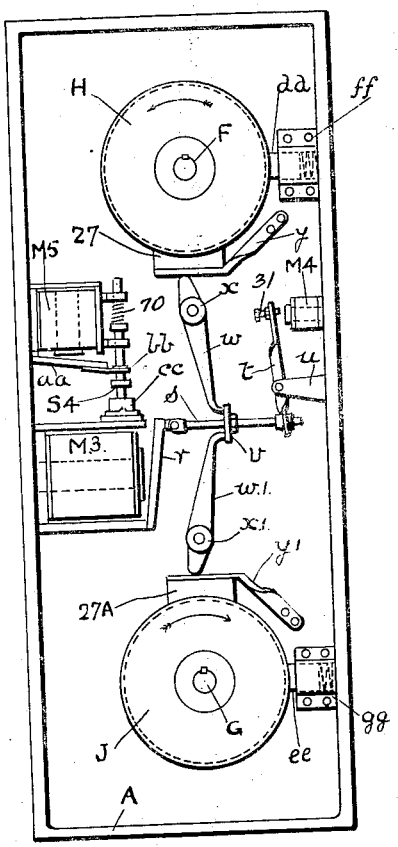
Figure 2 is an end view showing the brake-drums and control-gear.

Referring to the drawings, we provide two end bearing frames A and B, carrying a top and bottom roller D and E, these rollers D and E being mounted on the shafts F and G respectively, which shafts F and G are supported on suitable bearings on the frames A and B, at each end of shafts F and G and project into the frames A and B. An impeller 30 is fixed to that part of the shaft F which projects into the frame B. A similar impeller 30A is fixed to that end of the shaft G, which also projects into the frame B.

The other end of the shaft F projects within the frame A, and has fixed to it a brake-drum H, the other end of the bottom shaft G also projects into the frame A, and has also fixed to the end of it a brake-drum J.

The screen K is of any suitable transparent material, each end of which is suitably fixed to the rollers D and E, and is of ample or sufficient length to suitably carry a suitable number of advertisements or announcements of equal pitch, and capable of being wound from one roller to another. The screen K may be provided with pockets or compartments $nn$ for carrying the advertisements or announcements formed by cross-pieces $mm$. Two, or other suitable number of lamps 29 and 29A, are positioned behind the screen K, and between the top and bottom rollers D and E. Attached to one edge of screen K is a metal band 26A carrying a suitable number of holes 26 of equal pitch. These holes 26 engage with a metering-wheel 25, which metering-wheel is fixed to one end of the shaft L, the other part of the shaft L projecting into a casing M contained within, and fixed to frame B. Fixed to the shaft L, and within the casing M, there is a worm N. A rotating switch S3 having a contact-piece $hh$ formed thereon, is also fixed to the shaft L, and is also contained within the casing M. A worm-wheel-segment O is fixed to a shaft P, the shaft P being carried between the sides of the casing M, the teeth of the worm-wheel-segment O engage with the worm N. One end of the shaft P projects through the casing M, and has fixed thereon a bracket Q, this bracket Q being provided with two horns Q1 and Q2, adjusting-screws R and R1. There is also another shaft S, on which is fixed a drum-switch RS, also contained within the casing M. One end of the shaft S projects through the casing M, and has fixed thereon a double-arm bracket T, the lower arm of which projects between the adjusting-screws R and R1, the upper arm of which is of sufficient length to engage, when revolved, with either of two springs U and U1 fixed to the sides of the casing M, a spring $jj$ is attached to a pin $kk$ on the upper arm of the bracket T, and to a pin $ll$ on the lower portion of the bracket Q, see Figures 1, 3 and 6.

The magnet operating switch consists of two plates S2 and 6A, one on top of the other, and each suitably hinged at the bottom to a bracket V, which bracket V is attached to the wall of the bearing-frame B, the upper end of the plate S2 being provided with a contact-bar S4. A plate W is also attached to the plate 6A and projects above and below it, the lower portion of the plate W being connected to the armature plate X of the magnet M1 by the rod X2. The upper end of the plate W is connected to a time-lag-vane $a$, through the medium of a rod $10a$, lever 11A and gear-wheels $c$, $e$ and $f$, a pawl $d$ being suitably pivoted to the lever 11A, the point of the pawl $d$ engaging with the teeth of the gear $c$. These gears $c$, $e$ and $f$, are suitably designed so that a small part of a revolution on gear $c$ gives a great many revolutions to the time-lag-vane $a$. The length of the rod $10a$ may be varied by an adjusting-nut Y. Suitably attached to the plate S2, there is a projecting-piece or cylinder Z carrying within it a plunger-pin $g$, the pin $g$ being capable of sliding within the projecting-piece or cylinder S, and which pin $g$ has behind it a small spring $h$, the action of which spring $h$ is to push the pin $g$, outwards, but is limited in its travel by a cross-piece $j$ fixed to the pin $g$, and engaging with a slot $k$ on the projecting-piece or cylinder Z. The plates S2 and 6A are free from one another, but are held together by the pressure of the spring $l$ mounted on the bolt $m$, which is provided with a shoulder, the small diameter of which is screwed through the plates 6A and W. an electro-magnet M2 is fixed to a bracket P, which is suitably attached to the wall of the casing B in a position in line with the pin $g$ contained in projecting-piece or cylinder Z, which in turn is attached to the plate S2. Suitable contacts C3 and C4 being attached to the wall of the casing B, engage with the contact $s4$ when the time-lag is operated.

The impeller-operating-switch consists of a plate S1, which is also hinged at the bottom to the bracket V, and having contact bar $s3$ at the upper end, a cross-bar $n$ being attached to the front of it, and projecting over the plate W on S2, a small adjusting-screw $n1$ being attached thereto, and engaging with the plate W.

Located on the end-frame B, and opposite to the plates S1 and S2 are two recessed housings 34, each of which carries a spring 15A, and through each spring there passes a bolt 14A, each provided with adjusting nuts $14a$, one bolt passing through plate S1, and the other through plates S2, 6A and W, and each having a nut attached at the end.

The brake mechanism contained in the casing A, Figure 2, consists of an operating magnet M3, suitably fixed to the wall of the casing A, and having attached to the armature plate $r$ one end of a lever $t$, thus lever $t$ being pivoted on a bracket $u$ attached to the wall of the casing A, the other end of the lever $t$ having an adjusting-screw 31. A small electro-magnet M4 is suitably fixed to the wall of the casing A, the centre of which magnet is positioned in line with the adjusting-screw 31. Suitably positioned on the rod S there is a cross-piece $v$, which engages with the ends of two brake-levers $w$ and $w1$, these brake-levers $w$ and $w1$ being pivoted on pins $x$ and $x1$ which pins $x$ and $x1$ are fixed to the walls of the casing A, the other end of the brake-levers $w$ and $w1$ engage with spring brackets $y$ and $y1$, these spring brackets $y$ and $y1$ also being attached to the wall of the casing A. They also carry the brake-blocks 27 and 27A, which engage with the brake-drums H and J. Another electro-magnet M5 is also attached to the wall of the casing A, and has attached to its armature plate $aa$ a spring-release-contact $bb$, which engages with another contact $cc$ carried on the top of the magnet M3, the contacts $bb$ and $cc$ forming the switch S4. A coil spring 70, as shown in Figure 2, is mounted upon the contact pin $bb$ to permit upward movement of the pin under the action of the armature plate $aa$, and provide a means for returning these parts to initial position. Two other friction blocks $dd$ and $ee$ are also provided and engage with the brake-drums H and J respectively, and are suitably held in position by the brackets $ff$ and $gg$ attached to the wall of the casing A.

The magnetic-impellers 30 and 30A are similar, and consist of a yoke-ring 34, which is made from non-magnetic metal and has a suitable number of steel magnetic collectors 35, 36, 37 and 38, which are tapered to the centre at one end. Rotatable inside these magnetic collectors and mounted on the roller-shaft F, are a series of magnet coils 39, 40, 41, $39a$, $40a$ and $41a$, which have mounted on the outside thereof, and just clear of the collectors 35, 36, 37 and 38, the magnetic-pole-shoes 42, 43, 44, $42a$, $43a$ and $44a$, which are magnetized by magnet coils 39, 40, 41, $39a$, $40a$ and $41a$. Magnet coil 39 is connected in series with coil 39a, by wire 45. Magnet coil 40 is connected in series with magnet coil 40a, by wire 46, and magnet coil 41 is connected in series with magnet coil 41a by wire 47. The end of the windings of magnet coils 41 and 39a and 40a, are all joined to slip ring R1, by wires 65, 64 and 63 respectively, see Figures 7 and 8.

The following will show how impeller 30 works. The direction of rotation is clockwise on Figures 1 and 3.

When the power is switched on through the switch S1, the current is conveyed by wire 1 to the contact C8 of switch RS, the current is then passed to contact C7 of the switch RS, and conveyed by wire 2 to contact C12 of CB1, contact C12 then passes the current to contact segment 48 of CB1, from contact segment 48 of CB1, the current is fed by wire 62 through magnet coil 40, after passing through magnet coil 40 the current is fed by wire 46 to magnet coil 40a, and after passing through magnet coil 40a, the current is fed by wire 63 to the slip ring R1, and after being collected by contact brush C13, the current is fed by wire 4 to contact C1 of the switch S1, through the switch S1 to the contact C2, also of switch S1, and the circuit is then completed by wire 6.

The moment power is applied to magnet coils 40 and 40a, a rotating movement is imparted to the roller shaft F, due to the magnetic attraction between the pole-shoes 43 and the magnetic collector 37, and the pole-shoe 43a and magnetic collector 35. When the pole-shoes 43 and 43a are rotated on the roller shaft F to the magnetic centre of collectors 37 and 35, the contact segment 48 of CB1 has just broken contact with contact C12, and contact segment 49 of CB1 has just made contact with C12, the current is then fed to the magnet coil 41a by wire 61 and after passing through magnet coil 41a, the current is fed to the magnet coil 41 by wire 47. After passing through the magnet coil 41, the current is fed by wire 65 to the switch S1 in the same manner described with reference to magnet coils 40 and 40a.

The moment power is transferred to magnet coils 41 and 41a, a further rotating movement is imparted to the roller-shaft F, due to the magnetic attraction between pole-shoe 44 and magnetic collector 38, and pole-shoe 44a, and magnetic collector 36. When pole-shoes 44 and 44a are rotated to the magnetic centre of magnetic collectors 38 and 36, the contact segment 49 of CB1 has just broken contact with contact C12, and contact segment 50 of CB1 has just made contact with C12. The power is now transferred to magnet coils 39 and 39a, and a further rotating movement is imparted to roller shaft F, due to the magnetic attraction between the pole-shoe 42 and the magnetic collector 37, and the pole-shoe 42a, and magnetic collector 35. When pole shoes 42 and 42a are rotated to the magnetic centre of the magnetic collectors 37 and 35, the contact segment 50 of CB1 has just broken contact with C12 and the contact segment 51 of CB1 has just made contact with contact C12. The power is now transferred to the magnet coils 40 and 40a in the manner already described, and a further rotating movement is imparted to the roller shaft F, when pole-shoes 43 and 43a are rotated to the magnetic centre of the magnetic collectors 36 and 38, the contact segment 51 of CB1 has just broken contact with contact C12, and the contact segment 52 of CB1 has just made contact with contact C12, and the power is transferred to magnet coils 41 and 41a. This rotary movement will continue so long as switch S1 is closed.

Figure 3:
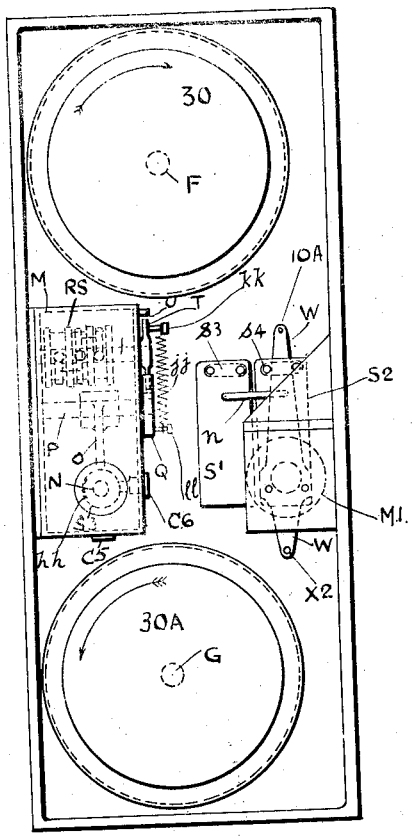
Figure 3 is a view of the opposite end shown in Figure 2.

The action of the magnet impeller 30A is similar, but is opposite in direction to impeller 30, being anti-clockwise on Figures 1 and 3.

The purpose of magnets M1 and M2 are as follows:—

Magnet M1 is used to control the operation of switches S1 and S2. While one of the impellers is running the impeller operating switch S1 and the magnet operating switch S2 are held closed by springs 15A, the circuit to magnet M1 being broken at C5. The moment the switch S3 is rotated under contact brush C5, the switch S2, which has already made contact, is put into operation and couples up magnets M1 and M2 in circuit. Magnet M1 is then energized, and opens the switches S1 and S2. Magnet M2 is used to provide a retarding action to switch S2 through the magnetic attraction to plunger g, which is situated in projecting-piece or cylinder Z, which, in turn, is fixed to the plate of switch S2.

The following are the purposes of magnets M3, M4 and M5.

The magnet M3 is controlled by switches S2 and S3, the object being to apply the brakes 27 and 27A to brake-drums H and J respectively, by means of magnet M3 the moment contact segment hh of switch S3 is rotated under contact brush C5. Switch S2, which has already made contact, is then opened by magnet M1. The magnet M3 is energized only for a short time until switch S2 is opened. In order that the brakes may be longer applied magnet M4 is provided which is held energized as long as the lighting switch is held closed by spring 70.

Magnet M4 is controlled by lighting switch S4, the object being to hold on the brakes 27 and 27A during the time the advertisement or announcement is being exposed, the moment the lighting switch S4 is opened by means of magnet M5, the magnet M4 releases the adjusting-screw 31, which, in turn, releases the brake-blocks 27 and 27A and so allows the impeller to start up.

Magnet M5 opens the lighting switch S4 in the following manner. The moment contact segment hh of switch S3 is rotated under contact brush C5, the switch S1, which has already made contact, and is in series with switch S3, starts up the impeller, and, at the same time, operates magnet M5, which magnet M5 in turn opens switch S4 and so extinguishes the lamps.

The purposes of switches S1 and S2 are as follows:—

It was found necessary in practice to provide means of allowing the switch S1 to close before switch S2, and to open switch S1 slightly in advance of switch S2. The object of this is to allow the impeller to draw the band carrying the advertisement or announcement from one roller on to the other roller, and so turn the rotating switch S3, which is operated by a toothed metering-wheel 25, meshing with the holes 26 of the band 26A, which is fixed to one edge of the screen K carrying the advertisements or announcements. The moment the contact segment hh of switch S3 is rotated clear of the contact brush C5 of switch S3, the switch S2 is timed to close, and make contact. The magnets M1 and M2 are now out of circuit until the rotating switch S3 has made one complete turn and brought the contact segment hh under contact brush C5. On this contact taking place, the magnets M1 and M2 are energized, and the switches S1 and S2 are thrown open. The rotating switch S3 is in series with switch S2, so as to allow rotating switch S3 to rotate clear before switch S2 makes contact. If switch S2 made contact before the contact segment $hh$ of switch S3 was clear of contact brush C5, the magnets M1 and M2 would operate and open switches S1 and S2, and so prevent whatever impeller was in circuit from working, as the switch S1 controls both impellers, according to the position of the reversing switch RS.

On power being applied, the magnets M1 and M2 are energized due to contact segment $hh$ of rotating switch S3 being in contact with contact brush C5, and switches S1 and S2 being also closed. The moment magnets M1 and M2 are energized, the motion of armature plate X of magnet M1 is transmitted to S1 and S2, by means of connecting rod X2, which connects the armature plate X of magnet M1 to the extension plate W, which is fixed to plate 6A of switch S2, which is hinged to bracket V by hinge 13. An adjustment-bar $n$ is fixed to plate of switch S1, and overlaps plate W of switch S2, and is provided with an adjustment screw $n1$ at one end, the object of this adjustment screw $n1$ fixed on adjustment-bar $n$ is to provide a variable position between contacts S4 and $q$. In order to allow the armature plates of magnets M1 and M3 their full travel, it was found necessary to provide a retarded action on switch S2 in the following manner:—

Before power is applied to magnets M1 and M2, the metal plunger $g$ is compressed against the face of the steel core of magnet M2, the switches S1 and S2 are understood to be closed. Screwed into plates 6A and W of switch S2 is a metal shoulder pin $m$, which has a light compression spring $l$ carried on the large diameter, the small diameter of this shoulder pin $m$ passes freely through a hole in plate of switch S2. On power being applied to the magnet M1, the armature plate X is attracted to the steel core of magnet M1, and so opens switches S1 and S2 in the following manner:—

The switch S1 and the plates 6A and W of switch S2 are free to open, but the plate of switch S2 is held magnetically by the steel plunger $g$, and the steel core of magnet M2, until the spring $l$ is compressed, and the shoulder of pin $m$ comes in contact with plate of switch S2, when the pressure or power exerted by magnet M1 exceeds the magnetic pull of magnet M2 on the steel plunger $g$, and the contact between the faces of the steel plunger $g$ and the steel core of magnet M2 is broken, the compression spring $l$ opens, and the plate of switch S2 swings over to the position of plate 6A, and so opens the switch S2.

With regard to the exposure timing gear, in order to allow a uniform period of time for the exposure of each advertisement or announcement a small gear train, $c$, $e$ and $f$ contained in a gear-box 33 is employed, carrying on the high speed shaft a small fan or air brake $a$. This gear train is driven in the following manner:—Fixed to the end frame B, in a suitable position, is the gear-box 33 complete with gear train, connected to the first motion shaft $b$ and gear-wheel $c$ of the gear-box 33, by means of a ratchet $d$. There is a lever 11A, which, in turn, is connected by means of rod 10A to extension plate W, which is fixed to plate 6A of switch S2, so that any movement of switch S2 is transmitted to lever 11A. Located in the end frame B are two recessed housings 34 to take compression springs 15A, passing through each spring 15A is rod 14A, provided with two nuts 14$a$ for adjusting the pressure of springs 15A. When the machine is running, these springs 15A are pulling the switches S1 and S2 against the load imposed by the gear-train contained in gear-box 33. If the spring 15A pressure is increased, the period of time taken by the switches S1 and S2 to close is lessened, but, if the spring 15A pressure is weakened, the period of time taken by the switches S1 and S2 to close is lengthened, if the switches S1 and S2 take 10 seconds to close, then the advertisements or announcements will be exposed for 10 seconds. The moment magnets M1 and M2 are energized, the switches S1 and S2 are thrown open against the compression springs 15A, and the ratchet-gear $d$ carried on lever 11A is operated by the switches S1 and S2, passes over a certain number of teeth on the first motion driving-wheel $c$. The moment magnets M1 and M2 are de-energized, due to switches S1 and S2 opening, the springs 15A then take up the drive of the gearing contained in gear-box 33 through the lever 11A, and so slowly allows the switches S1 and S2 to close.

Figure 11:
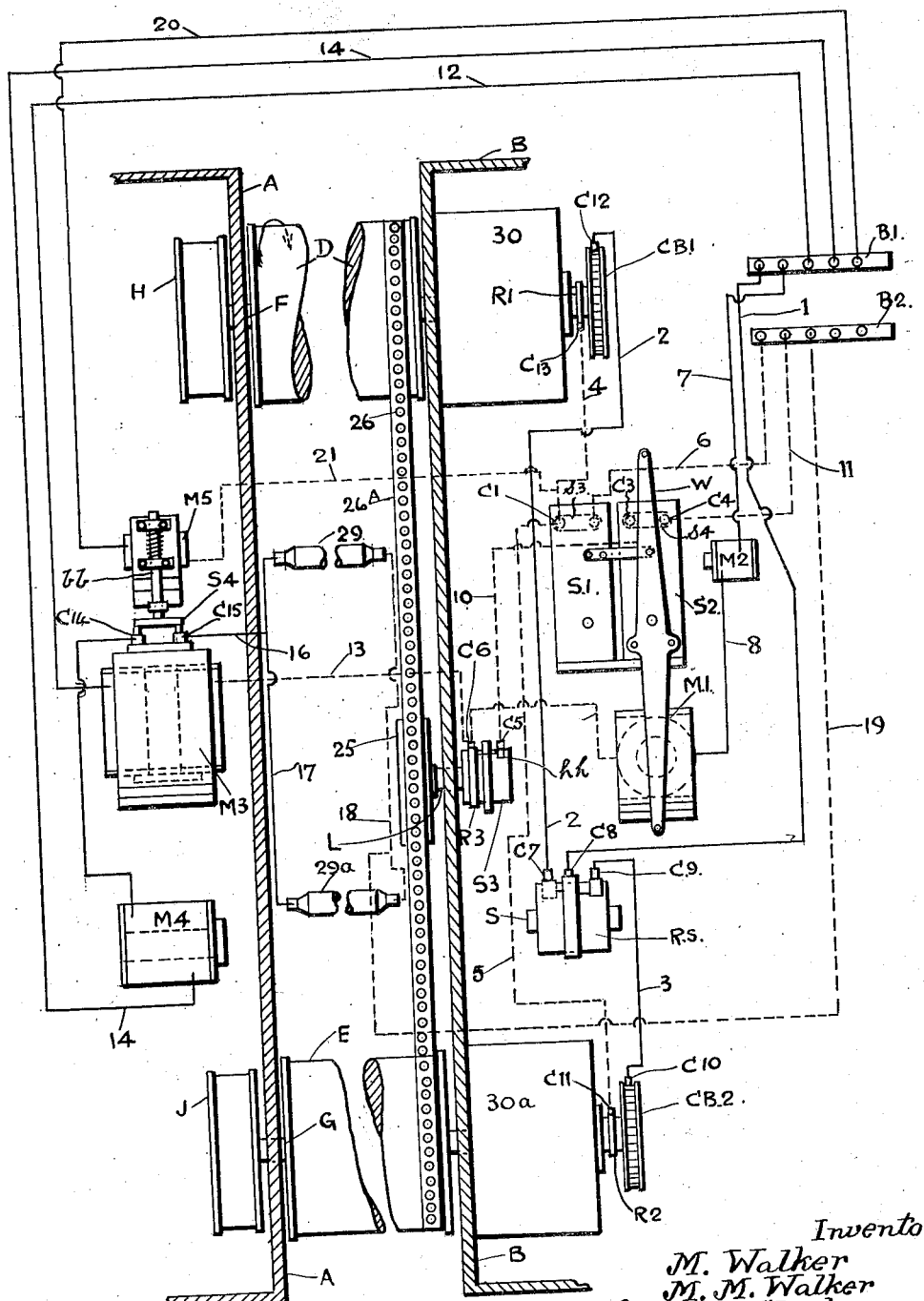
Figure 11 is a plan of the wiring diagram.

Referring to Figure 11 of the drawings, we will now describe the wiring of switches S1 and S2 and magnets M1 and M2. Current is led by wire 7 from positive bus-bar B1, to the beginning of the coil magnet M2. After passing through the coil of magnet M2, the ending of the coil is connected to the beginning of the coil of magnet M1 by wire 8, thus putting the magnet M2 in series with magnet M1. After passing through the coil of magnet M1, the current is led to contact C6 of switch S3 by wire 9, the slip-ring R3 of switch S3 then passes the current to a segment $hh$ which makes contact with contact C5, the current is led to C3 of switch S2 by wire 10, and having passed to contact C4 of switch S2, the current is fed back to the negative bus-bar B2 by wire 11.

We will now describe the wiring of magnet M3, which operates the brakes 27 and 27A.

The current is led from positive bus-bar B1 by wire 12 to the beginning of the coil of magnet M3, and, after passing through the coil M4, the current is led by wire 15 to contact C14 of switch S4, after passing to contact C15 of switch S4, the current is led by wire 16 to wire 17, which is the feed for the strip lights 29 and 29$a$. Having passed through the strip-lights which are in parallel, the current is collected by wire 18, and fed by wire 19 to the negative bus-bar B2. It will be observed that the magnet M4 is in series with the switch S4, and the strip lights 29 and 29$a$.

The operation of lighting switch magnet M5 is as follows:—

The current is led by wire 20 from positive bus-bar B1 to the beginning of the coil of magnet M5, and having passed through the coil of magnet M5, is led by wire 21 to contact C1 of switch S1. The object of taking wire 21 to contact C1 of switch S1 is as follows:—The magnet M5 must not operate until any one impeller is working, and, as the contact C1 of switch S1 is the common negative of the impeller winding, the magnet M5 cannot operate until the switch S1 has closed in order to start up the impeller. At the moment switch S1 is closed, the impeller starts up, and the magnet M5 operates, which, in turn, opens the lighting-switch S4, and so extinguishing the strip-lights 29 and 29$a$, and de-energizes the magnet M4, which, in turn, releases the brakes 27 and 27$a$, and so allows the impeller to rotate due to switch S4 opening the moment magnet M5 is coupled in circuit. The current on reaching the contact C1 of switch S1, passes to the contact C2 of the switch S1 and led back by wire 6 to negative-bus-bar B2.

Having now particularly described and ascertained the nature of our said invention and in what manner the same is to be performed, we declare that what we claim is:—

1. In an advertising apparatus and display sign, a frame, top and bottom rollers mounted in the frame, a screen connected at opposite ends to the rollers and adapted to be wound back and forth thereon, a metering wheel mounted on the frame and engaging in rolling contact with a side portion of the screen, lamps disposed within the frame behind the screen, a magnetic impeller connected to each roller, and electro-magnetic switches between the impellers and the metering wheel for alternately driving the rollers upon a predetermined operation of the metering wheel in opposite directions.

2. Advertising apparatus and display signs as in claim 1, characterized in the provision of means for retarding the action of the switches consisting of an electro-magnet in conjunction with a pin contained in a cylinder, which cylinder is attached to the switch.

3. Advertising apparatus and display signs as in Claim 1, characterized in the provision of means of timing of switches for obtaining even and regular exposure of the advertisements or announcements on the screen.

4. Advertising apparatus and display signs as in claim 1, characterized in the provision of means for reversing the action of movement of the apparatus, whereby the screen, after leaving one roller and wound on to the other, will be rewound on to the roller on the reverse action or movement of the apparatus.

5. In advertising apparatus and display signs as in claim 1, the wiring circuit for operation of lighting, the operation of the impellers and the operation of the brakes on brake drums, and operation of switches.

MALCOLM WALKER.
MALCOLM MONTAGUE WALKER.
GEORGE MORTON CLARK.